United States Patent
Suzuki et al.

(10) Patent No.: US 11,740,688 B2
(45) Date of Patent: Aug. 29, 2023

(54) VIRTUAL SPACE EXPERIENCE SYSTEM

(71) Applicant: ABAL INC., Tokyo (JP)

(72) Inventors: Shota Suzuki, Tokyo (JP); Tsuyoshi Nomura, Tokyo (JP); Yoshikatsu Kanemaru, Tokyo (JP); Yoshiya Okoyama, Tokyo (JP); Yoshimasa Takahashi, Tokyo (JP)

(73) Assignee: Abal Inc., Tokyo (JP)

( * ) Notice: Subject to any disclaimer, the term of this patent is extended or adjusted under 35 U.S.C. 154(b) by 0 days.

(21) Appl. No.: 17/775,656

(22) PCT Filed: Nov. 13, 2019

(86) PCT No.: PCT/JP2019/044593
§ 371 (c)(1),
(2) Date: May 10, 2022

(87) PCT Pub. No.: WO2021/095175
PCT Pub. Date: May 20, 2021

(65) Prior Publication Data
US 2022/0404899 A1 Dec. 22, 2022

(51) Int. Cl.
*G06F 3/01* (2006.01)
*A63F 13/213* (2014.01)
*G06T 13/40* (2011.01)

(52) U.S. Cl.
CPC ............ *G06F 3/011* (2013.01); *A63F 13/213* (2014.09); *G06T 13/40* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2010/0281437 A1* | 11/2010 | Stone-Perez | A63F 13/213 715/863 |
| 2020/0368616 A1* | 11/2020 | Delamont | A63F 13/65 |
| 2021/0375257 A1* | 12/2021 | Tajik | G10K 15/02 |

FOREIGN PATENT DOCUMENTS

| | | |
|---|---|---|
| JP | 2018-013900 A | 1/2018 |
| JP | 2018-013901 A | 1/2018 |

* cited by examiner

*Primary Examiner* — Ifedayo B Iluyomade
(74) *Attorney, Agent, or Firm* — Carrier, Shende & Associates P.C.; Joseph P. Carrier; Fulchand P. Shende

(57) ABSTRACT

A virtual space experience system capable of preventing unintentional contact between players without inhibiting a sense of immersion is provided. A virtual space image determination unit 35 of a VR system S causes an image of a virtual space to be perceived by a second player to include an image in which a first avatar corresponding to a first player moves so as to generate a gap in a correspondence relationship between coordinates of the first player and coordinates of the first avatar when a trigger event is recognized, and causes the image of the virtual space to be perceived by the second player to include an image of a second avatar corresponding to the second player and a third avatar corresponding to the first player after the recognition. An avatar coordinate determination unit 34 determines coordinates of the third avatar based on the coordinates of the first player.

7 Claims, 10 Drawing Sheets

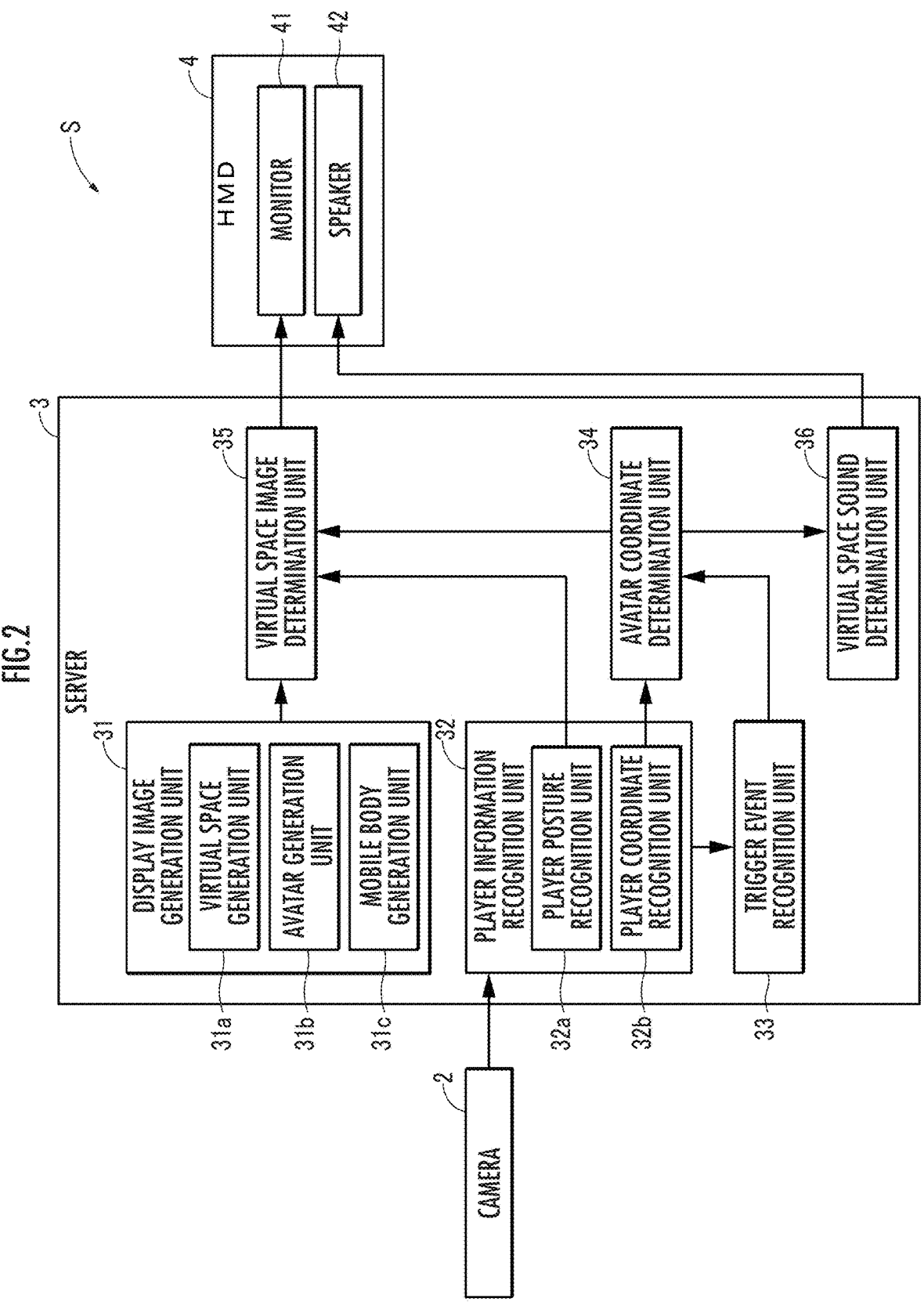

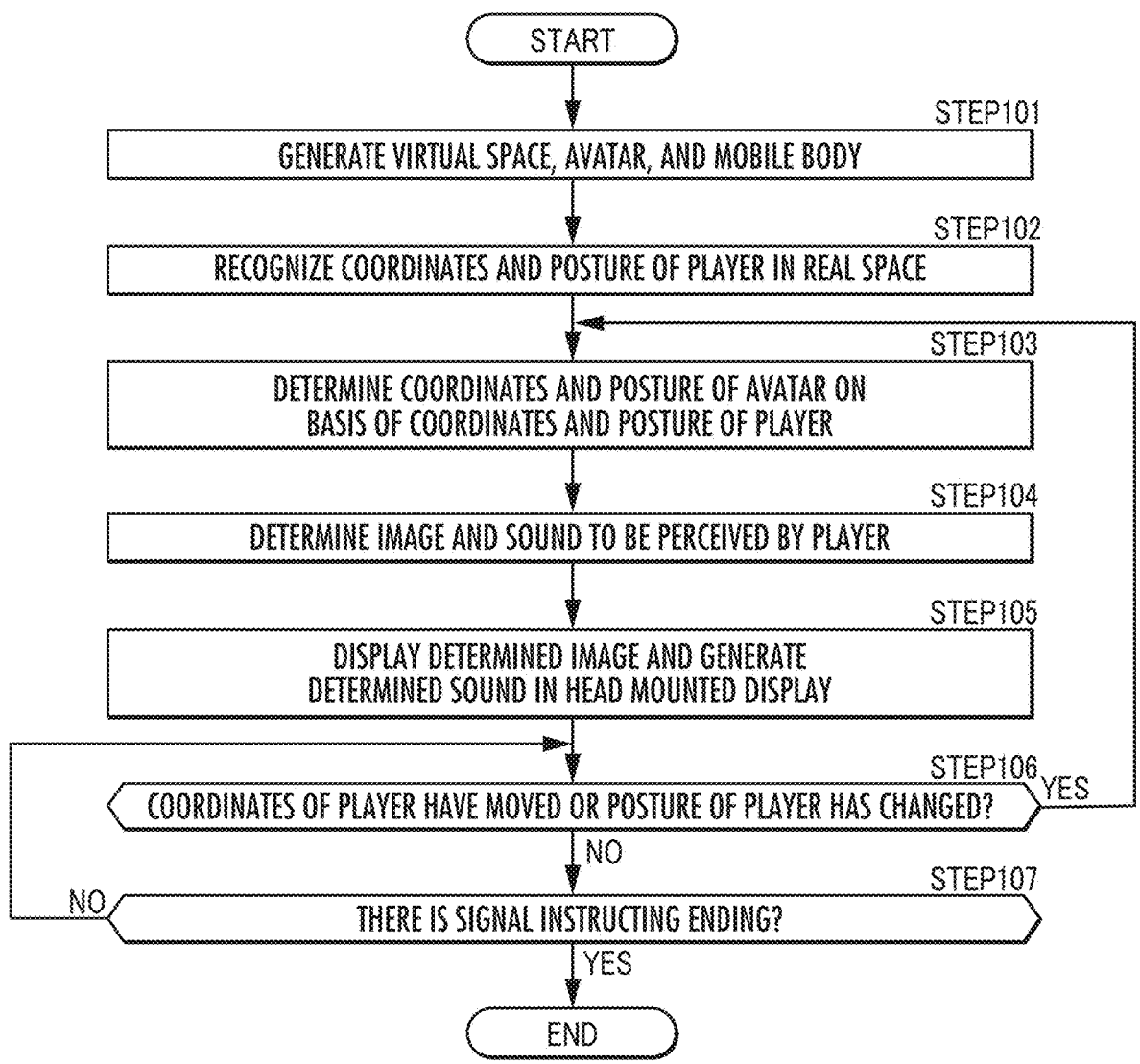

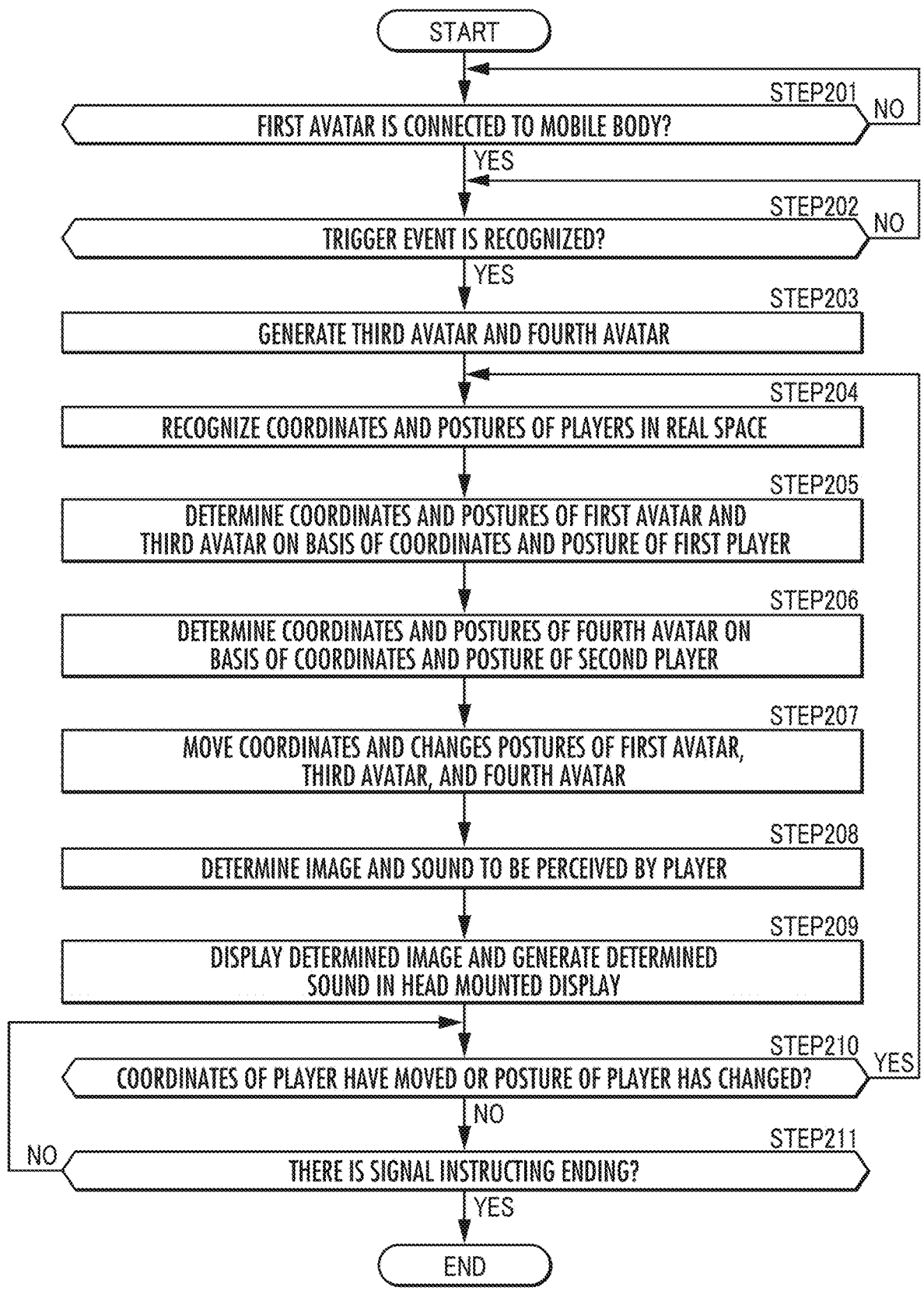

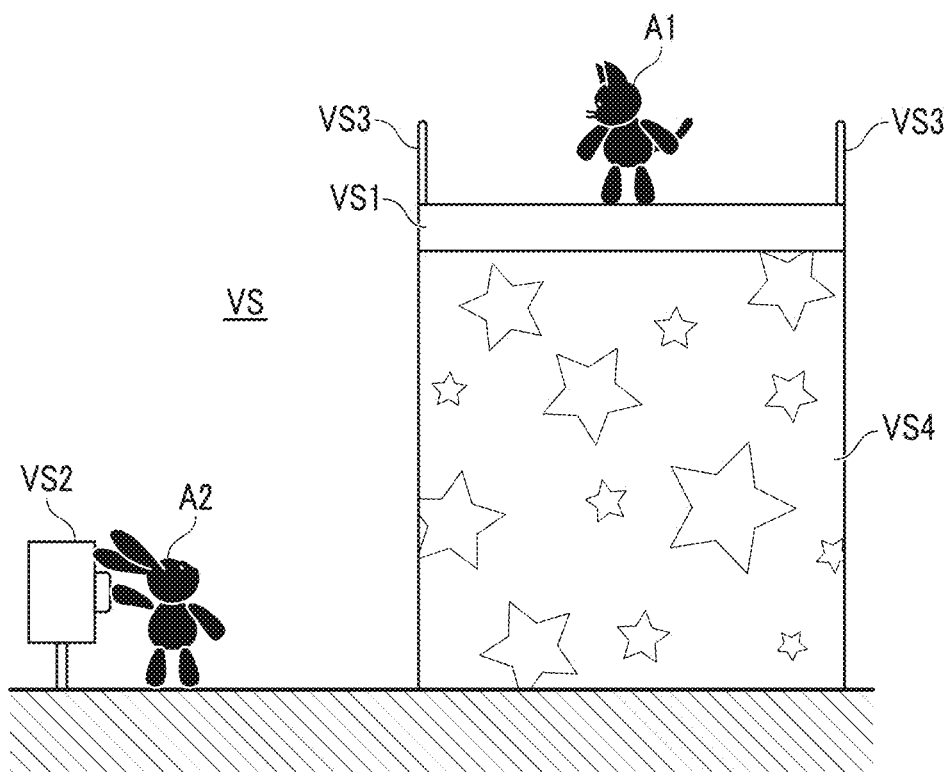

VIRTUAL SPACE EXPERIENCE SYSTEM

TECHNICAL FIELD

The present invention relates to a virtual space experience system for causing a player to perceive that player himself/herself exists in a virtual space displayed as an image.

BACKGROUND ART

Hitherto, there has been a virtual space experience system which generates a virtual space in a server and the like, causes a player to perceive an image of the virtual space via a head mounted display (may be hereinafter referred to as an "HMD"), and causes the player to perceive that the player himself/herself exists in the virtual space.

As a virtual space experience system of such type, there is a virtual space experience system which recognizes a motion (for example, the movement of coordinates, the change of posture, and the like) of the player in a real space by a motion capture apparatus and the like and causes an avatar corresponding to the player in the virtual space to perform a motion in accordance with the recognized operation (for example, see Patent Literature 1).

In the virtual space experience system described in Patent Literature 1, a plurality of players exist in the same room in the real space, and hence a plurality of avatars are generated in the same virtual space corresponding to the room so as to correspond to the respective players.

CITATION LIST

Patent Literature

Patent Literature 1: Japanese Patent Laid-Open No. 2018-013901

SUMMARY OF INVENTION

Technical Problem

Incidentally, in the virtual space experience system of Patent Literature 1, a gap is intentionally generated in the correspondence relationship between coordinates of the player in the real space and coordinates of the avatar corresponding to the player in the virtual space. As a result, another player which is perceiving the player or the avatar corresponding to the player can be caused to perceive a virtual space which is expanded as compared to the real space.

When such gap is generated, there has been a fear that the players are not be able to properly grasp the positional relationship with each other in the real space and unintentionally come into contact with each other. Furthermore, there has been a fear that a sense of immersion into the virtual space is inhibited.

The invention has been made in view of the abovementioned points, and an object thereof is to provide a virtual space experience system capable of preventing unintentional contact between players without inhibiting a sense of immersion.

Solution to Problem

A virtual space experience system of the present invention includes:

a virtual space generation unit which generates a virtual space corresponding to a predetermined region in a real space in which both of a first player and a second player exist;

an avatar generation unit which generates a first avatar which performs a motion in correspondence with a motion of the first player, and a second avatar which performs a motion in correspondence with a motion of the second player in the virtual space;

a player coordinate recognition unit which recognizes coordinates of the first player and coordinates of the second player in the real space;

an avatar coordinate determination unit which determines coordinates of the first avatar in the virtual space on basis of the coordinates of the first player, and determines coordinates of the second avatar in the virtual space on basis of the coordinates of the second player;

a virtual space image determination unit which determines an image of the virtual space to be perceived by the first player and the second player on basis of the coordinates of the first avatar and the coordinates of the second avatar;

a trigger event recognition unit which recognizes occurrence of a predetermined trigger event; and a virtual space image displayer which causes the first player and the second player to perceive the image of the virtual space. In the virtual space experience system:

the avatar generation unit generates a third avatar corresponding to the motion of the first player in the virtual space when the trigger event is recognized;

the virtual space image determination unit causes the image of the virtual space to be perceived by the second player to include an image in which the first avatar moves so as to generate a gap in a correspondence relationship between the coordinates of the first player and the coordinates of the first avatar when the trigger event is recognized, and causes the image of the virtual space to be perceived by the second player to include an image of the second avatar and the third avatar after the trigger event is recognized; and the avatar coordinate determination unit determines coordinates of the third avatar in the virtual space on basis of the coordinates of the first player.

"The image of the virtual space" refers to an image from which the player may presume the coordinates of the avatar corresponding to the player in the virtual space. For example, the image of the virtual space includes an image of another avatar, an image of an object existing only in the virtual space, and an image of an object existing in the virtual space in correspondence with the real space besides an image of the background of the virtual space.

The "gap" in the correspondence relationship between the coordinates of the player and the coordinates of the avatar includes the movement amount of the coordinates of the avatar with respect to the movement amount of the coordinates of the player, a gap generated when the player and the avatar are moved after the time it takes to reflect the movement of the coordinates of the player to the movement of the coordinates of the avatar changes, and the like besides a gap generated by only moving the coordinates of the avatar when there are no movements of the coordinates of the player.

As above, in the virtual space experience system of the present invention, when a predetermined trigger event is recognized, the image of the virtual space to be perceived by the second player is caused to include the image in which the first avatar moves. Therefore, at this time, the line of sight of the second player naturally follows the movement of the first avatar.

When the trigger event is recognized, the third avatar is generated in the virtual space. In other words, the third avatar is generated while the attention of the second player is drawn to the movement of the first avatar. The image of the virtual space to be perceived by the second player is caused to include the image of the third avatar after the trigger event is recognized.

By the above, according to the virtual space experience system, a case where the second player thinks that the third avatar has suddenly appeared (and a feeling of strangeness given to the second player) can be suppressed. As a result, the second player can be caused to accept the existence of the third avatar without inhibiting the sense of immersion of the second player.

When another avatar exists in the virtual space, the player normally tries to avoid contact between the avatar corresponding to the player and the other avatar.

In the virtual space experience system, when a trigger event occurs and a gap is generated between the coordinates of the first player and the coordinates of the first avatar corresponding to the first player, the third avatar corresponding to the coordinates of the first player is generated. The image of the virtual space to be perceived by the second player is caused to include the image of the third avatar.

Therefore, after the trigger event is recognized, when the second player performs some kind of motion, the second player performs the motion while naturally avoiding contact between the second avatar corresponding to the coordinates of the second player and the third avatar corresponding to the coordinates of the first player. By the above, the contact between the second player corresponding to the second avatar and the first player corresponding to the third avatar in the real space can be prevented.

In the virtual space experience system of the present invention:
the avatar generation unit generates a fourth avatar corresponding to the motion of the second player in the virtual space when the trigger event is recognized;
the virtual space image determination unit causes the image of the virtual space to be perceived by the first player to include an image in which the second avatar relatively moves with respect to the first avatar so as to correspond to the gap generated in the correspondence relationship between the coordinates of the first player and the coordinates of the first avatar when the trigger event is recognized, and causes the image of the virtual space to be perceived by the first player to include an image of the first avatar and the fourth avatar after the trigger event is recognized; and
the avatar coordinate determination unit determines coordinates of the fourth avatar in the virtual space on basis of the coordinates of the second player.

As above, when not only the third avatar corresponding to the first player is caused to exist in the virtual space but also the fourth avatar corresponding to the second player is caused to exist in the virtual space, a case where the first player thinks that the fourth avatar has suddenly appeared (and a feeling of strangeness given to the first player) can be suppressed. By the above, the first player can be caused to accept the existence of the fourth avatar without inhibiting the sense of immersion of the first player.

By the existence of the fourth avatar, the contact with the second player caused by the motion of the first player can be suppressed.

In the virtual space experience system of the present invention, the third avatar is preferred to have a shape which is different from a shape of the first avatar.

With the abovementioned configuration, the second player can be prevented from perceiving that the third avatar is an avatar corresponding to the first player. By the above, a case where a feeling of strangeness as if the first player has increased in number is given to the second player can be suppressed. In addition, it becomes even more difficult to inhibit the sense of immersion of the second player.

In the virtual space experience system of the present invention, when the shape of the first avatar and the shape of the third avatar are different from each other, the third avatar is preferred to be a wall which surrounds a range of the virtual space corresponding to a motion range of the first player in the real space.

As the third avatar, an object limited to a person and a character does not necessarily need to be employed, and a wall as above may be employed, for example. With the configuration as above, a case where a feeling of strangeness as if the avatar corresponding to the first player has increased in number is given to the second player can be suppressed. In addition, it becomes even more difficult to inhibit the sense of immersion of the second player.

A virtual space experience system of the present invention includes:
a virtual space generation unit which generates a virtual space corresponding to a predetermined region in a real space in which both of a first player and a second player exist;
an avatar generation unit which generates a first avatar which performs a motion in correspondence with a motion of the first player, and a second avatar which performs a motion in correspondence with a motion of the second player in the virtual space;
a player coordinate recognition unit which recognizes coordinates of the first player and coordinates of the second player in the real space;
an avatar coordinate determination unit which determines coordinates of the first avatar in the virtual space on basis of the coordinates of the first player, and determines coordinates of the second avatar in the virtual space on basis of the coordinates of the second player;
a virtual space image determination unit which determines an image of the virtual space to be perceived by the first player and the second player on basis of the coordinates of the first avatar and the coordinates of the second avatar;
a trigger event recognition unit which recognizes occurrence of a predetermined trigger event; and
a virtual space image displayer which causes the first player and the second player to perceive the image of the virtual space. In the virtual space experience system:
the avatar generation unit generates a fourth avatar corresponding to the motion of the second player when the trigger event is recognized;
the virtual space image determination unit causes the image of the virtual space to be perceived by the first player to include an image in which the second avatar relatively moves with respect to the first avatar so as to correspond to a gap generated in a correspondence relationship between the coordinates of the first player and the coordinates of the first avatar when the trigger event is recognized, and causes the image of the virtual space to be perceived by the first player to include an image of the first avatar and the fourth avatar after the trigger event is recognized; and the avatar coordinate determination unit determines coordinates of the fourth avatar in the virtual space on basis of the coordinates of the second player.

As above, when the fourth avatar corresponding to the second player is caused to exist in the virtual space as with the case where the third avatar corresponding to the first player is caused to exist in the virtual space, a case where the first player thinks that the fourth avatar has suddenly appeared (and a feeling of strangeness given to the first player) can be suppressed. By the above, the first player can be caused to accept the existence of the fourth avatar without inhibiting the sense of immersion of the first player.

By the existence of the fourth avatar, the contact with the second player caused by the motion of the first player can also be suppressed.

BRIEF DESCRIPTION OF DRAWINGS

FIG. 2 is a block diagram illustrating the VR system configuration of FIG. 1.

FIG. 3 is a flowchart illustrating processing to be executed in a stage in which the VR system of FIG. 1 has not recognized a trigger event.

FIG. 4 is a side view illustrating a state in which the trigger event has not started in the VR system of FIG. 1 in which

FIG. 5 is a side view illustrating a state when the trigger event starts in the VR system of FIG. 1 in which

FIG. 6 is a side view illustrating a state when the trigger event ends in the VR system of FIG. 1 in which

FIG. 7 is a side view illustrating a state after the trigger event has ended in the VR system of FIG. 1 in which

FIG. 8 is a flowchart illustrating processing to be executed when the VR system of FIG. 1 recognizes the trigger event.

FIG. 11 is a side view illustrating a state when the trigger event ends in the VR system of the modification and is a view illustrating the state of the virtual space.

DESCRIPTION OF EMBODIMENTS

A VR system S which is a virtual space experience system according to an embodiment is described below with reference to the drawings.

The VR system S is a system for causing a player to perceive that player himself/herself exists in a virtual space (so-called virtual reality (VR)) displayed as an image.

The VR system S causes a first player P1 and a second player P2 (hereinafter referred to as a "player P" when the first player P1 and the second player P2 are collectively referred to) which both exist in a predetermined region (for example, one room) in a real space RS to perceive that both exist in one virtual space VS corresponding to the region via a first avatar A1 corresponding to the first player P1 and a second avatar A2 corresponding to the second player.

[Schematic Configuration of System]

First, the schematic configuration of the VR system S is described with reference to FIG. 1.

Figure 1:
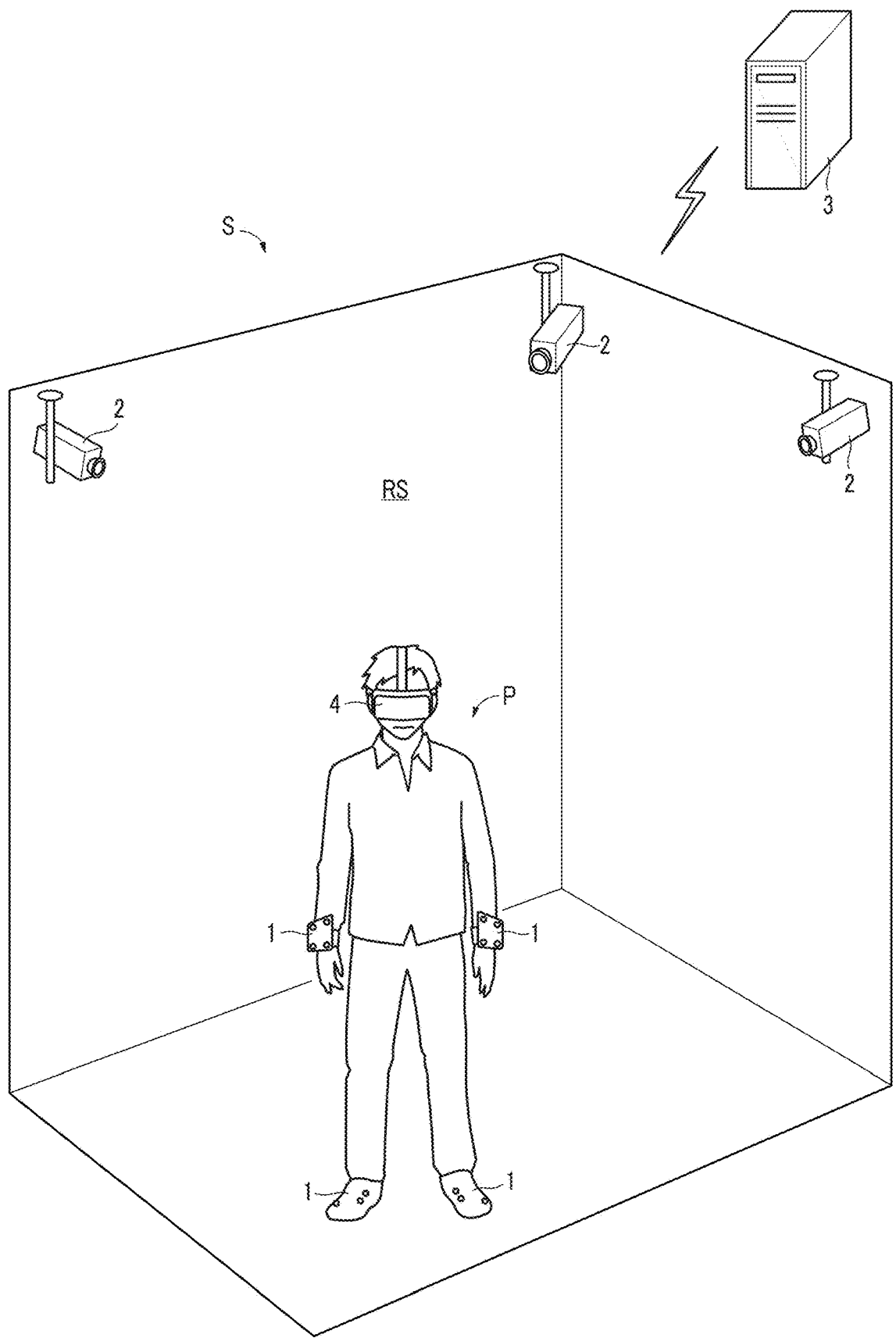
FIG. 1 is a schematic diagram illustrating a schematic configuration of a VR system according to an embodiment.

As illustrated in FIG. 1, the VR system S includes a plurality of markers 1 attached to the player P which exists in the real space RS, a camera 2 which captures the player P (to be exact, the markers 1 attached to the player P), a server 3 which determines an image and sound of the virtual space VS (see FIG. 4B and the like), and a head mounted display (hereinafter referred to as an "HMD 4") which causes the player to perceive the determined image and sound.

In the VR system S, the camera 2, the server 3, and the HMD 4 are able to wirelessly transmit and receive information to and from each other. Any of the camera 2, the server 3, and the HMD 4 may be configured to be able to transmit and receive information to and from each other in a wired manner.

The plurality of markers 1 are attached to each of the head, both hands, and both feet of the player P via the HMD 4, gloves, and shoes worn by the player P. The plurality of markers 1 are used to recognize the coordinates and posture of the player P in the real space RS as described below. Therefore, the attachment positions of the markers 1 may be changed, as appropriate, in accordance with other equipment configuring the VR system S.

The camera 2 is disposed so as to be able to capture a range (in other words, a range in which the movement of the coordinates, the change of the posture, and the like may be performed) in which the motion of the player P is possible in the real space RS in which the player P exists from multiple directions.

The server 3 recognizes the markers 1 from the image taken by the camera 2 and recognizes the coordinates and the posture of the player P on the basis of the positions of the recognized markers 1 in the real space RS. The server 3 determines the image and sound to be perceived by the player P on the basis of the coordinates and the posture.

The HMD 4 is worn on the head of the player P. In the HMD 4, a monitor 41 (virtual space image displayer) for causing the player P to perceive the image of the virtual space VS determined by the server 3, and a speaker 42 (virtual space sound generator) for causing the player P to perceive the sound of the virtual space VS determined by the server 3 are provided (see FIG. 2).

When a game and the like are played with use of the VR system S, the player P perceives only the image and sound of the virtual space VS and is caused to perceive that the player P himself/herself exists in the virtual space. In other words, the VR system S is configured as a so-called immersive system.

In the VR system S, a so-called motion capture apparatus configured by the markers 1, the camera 2, and the server 3 is included as a system which recognizes the coordinates of the player P in the real space RS.

However, the virtual space experience system of the present invention is not limited to such configuration. For example, when a motion capture apparatus is used, a motion capture apparatus having a configuration different from the abovementioned configuration in terms of the number of markers and cameras (for example, one is provided for each) may be used besides the abovementioned configuration.

An apparatus which only recognizes the coordinates of the player may be used instead of the motion capture apparatus. Specifically, for example, a sensor such as a GPS may be installed in the HMD, and the coordinates, the posture, and the like of the player may be recognized on the basis of an output from the sensor. The sensor as above and the motion capture apparatus as described above may be used together.

[Configuration of Processing Unit]

Next, the configuration of the server 3 is described in detail with reference to FIG. 2.

The server 3 is configured by one or a plurality of electronic circuit units including a CPU, a RAM, a ROM, an interface circuit, and the like. As illustrated in FIG. 2, the server 3 includes, as functions realized by a program or hardware configurations which are implemented, a display image generation unit 31, a player information recognition unit 32, a trigger event recognition unit 33, an avatar coordinate determination unit 34, a virtual space image determination unit 35, and a virtual space sound determination unit 36.

The display image generation unit 31 generates an image to be perceived by the player P via the monitor 41 of the HMD 4. The display image generation unit 31 has a virtual space generation unit 31*a*, an avatar generation unit 31*b*, and a mobile body generation unit 31*c*.

The virtual space generation unit 31*a* generates an image serving as a background of the virtual space VS and an image of an object existing in the virtual space VS.

The avatar generation unit 31*b* generates an avatar which performs a motion in correspondence with the motion of the player P in the virtual space VS. When there are a plurality of players P, the avatar generation unit 31*b* generates a plurality of avatars so as to correspond to each of the players P. The avatar performs a motion in the virtual space VS in correspondence with the motion (in other words, the movement of the coordinates and the change of the posture) of the corresponding player P in the real space RS.

The mobile body generation unit 31*c* generates, in the virtual space VS, a mobile body which is connectable to the avatar in the virtual space VS and of which corresponding body does not exist in the real space RS.

The "mobile body" only needs to cause the player P to predict the movement of the avatar different from the actual movement of the player (regardless of whether the player is conscious or not) when the avatar is connected.

For example, as the mobile body, a log which is floating on a river and onto which the avatar can jump, a floor which is likely to collapse when the avatar stands thereon, a jump stand, and wings which assist jumping are applicable in addition to a mobile body used in the movement in the real space such as an elevator. As the mobile body, characters, patterns, and the like drawn on the ground or a wall surface of the virtual space are applicable.

The "connection" between the avatar and the mobile body refers to a state in which the player may predict that the movement of the mobile body, the change of the shape of the mobile body, and the like affect the coordinates of the avatar.

For example, a case where the avatar rides an elevator, a case where the avatar rides on a log floating on a river, a case where the avatar stands on a floor which is about to collapse, a case of standing on a jump stand, and a case where the avatar wears wings which assist jumping correspond to the connection. A case where the avatar comes into contact with or approaches characters, patterns, and the like drawn on the ground or a wall surface of the virtual space also correspond to the connection.

In the player information recognition unit 32, image data of the player P including the markers 1 captured by the camera 2 is input. The player information recognition unit 32 has a player posture recognition unit 32*a* and a player coordinate recognition unit 32*b*.

The player posture recognition unit 32*a* extracts the markers 1 from the input image data of the player P and recognizes the posture of the player P on the basis of an extraction result thereof.

The player coordinate recognition unit 32*b* extracts the markers 1 from the input image data of the player P and recognizes the coordinates of the player P on the basis of an extraction result thereof.

The trigger event recognition unit 33 recognizes that a predetermined trigger event has occurred when a condition defined by a system designer in advance is satisfied.

The trigger event may be a trigger event of which occurrence is not perceived by the player. Therefore, as the trigger event, for example, an event due to the motion of the player such as an event in which the player performs a predetermined motion in the real space (in other words, the avatar corresponding to the player performs a predetermined motion in the virtual space) is applicable, and an event which is not due to the motion of the player such as the elapse of predetermined time is applicable.

The avatar coordinate determination unit 34 determines the coordinates of the avatar corresponding to the player P in the virtual space VS on the basis of the coordinates of the player P in the real space RS recognized by the player coordinate recognition unit 32*b*.

When the trigger event recognition unit 33 recognizes a trigger event, the avatar coordinate determination unit 34 corrects the coordinates of the avatar so as to generate a gap in the correspondence relationship between the coordinates of the player and the coordinates of the avatar corresponding to the player in a predetermined period of time or a predetermined range or a predetermined period of time and a predetermined range in accordance with the type of the recognized trigger event.

The "gap" in the correspondence relationship between the coordinates of the player and the coordinates of the avatar includes the movement amount of the coordinates of the avatar with respect to the movement amount of the coordinates of the player, a gap generated when the player and the avatar move after the time it takes to reflect the movement of the coordinates of the player in the movement of the coordinates of the avatar changes, and the like besides a gap generated by only moving the coordinates of the avatar when there are no movements of the coordinates of the player.

The virtual space image determination unit 35 determines an image of the virtual space to be perceived by the player P corresponding to the avatar via the monitor 41 of the HMD 4 on the basis of the coordinates of the avatar.

"The image of the virtual space" refers to an image from which the player may presume the coordinates of the avatar corresponding to the player himself/herself in the virtual space. For example, the image of the virtual space includes an image of another avatar, an image of an object existing only in the virtual space, and an image of an object existing in the virtual space in correspondence with the real space besides the image of the background of the virtual space.

The virtual space sound determination unit 36 determines sound to be perceived by the player P corresponding to the avatar via the speaker 42 of the HMD 4 on the basis of the coordinates of the avatar.

Processing units configuring the virtual space experience system of the present invention are not limited to the configurations as described above.

For example, some of the processing units provided in the server 3 in the abovementioned embodiment may be provided in the HMD 4. A plurality of servers may be used, or CPUs mounted on the HMDs may work together with the omission of a server.

A speaker other than the speaker mounted on the HMD may be provided. In addition to a device which affects the sense of vision and the sense of hearing, a device which affects the sense of smell and the sense of touch such as a device which causes smell, wind, and the like in accordance with the virtual space may be included.

[Processing to be Executed]

Next, with reference to FIG. 2 to FIG. 11, processing to be executed by the VR system S when the player P is caused to experience the virtual space VS with use of the VR system S is described.

[Processing in Normal Times]

First, with reference to FIG. 2, FIG. 3, and FIG. 4, processing to be executed by the VR system S in normal times (in other words, a state in which a trigger event described below is not recognized) is described.

In the processing, first, the display image generation unit 31 of the server 3 generates the virtual space VS, the first avatar A1, the second avatar A2, and the mobile bodies (FIG. 3/STEP 101).

Specifically, the virtual space generation unit 31a of the display image generation unit 31 generates the virtual space VS and various objects existing in the virtual space VS. The avatar generation unit 31b of the display image generation unit 31 generates the first avatar A1 corresponding to the first player P1 and the second avatar A2 corresponding to the second player P2. The mobile body generation unit 31c of the display image generation unit 31 generates mobile bodies such as an elevator VS1 described below.

Figure 4B:
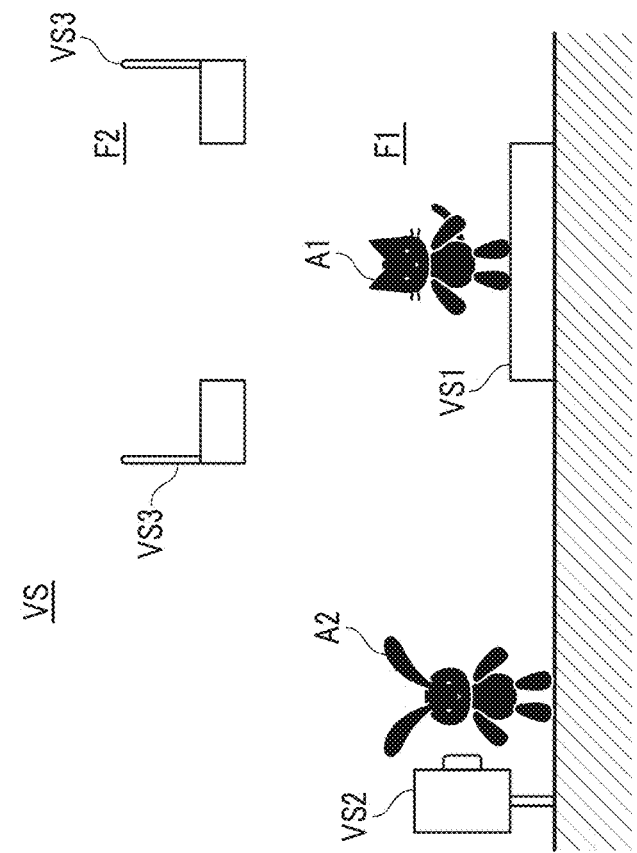
FIG. 4A is a view illustrating the state of a real space and FIG. 4B is a view illustrating the state of a virtual space.

As illustrated in FIG. 4B, in the virtual space VS generated by the processing in STEP 101, an object relating to a trigger event such as a switch VS2 generated in a position corresponding to a whiteboard RS1 (see FIG. 4A) installed in the real space RS is installed besides the first avatar A1, the second avatar A2, and the elevator VS1 which is a mobile body.

Next, the player information recognition unit 32 of the server 3 acquires image data captured by the camera 2 and recognizes the coordinates and the postures of the first player P1 and the second player P2 in the real space RS on the basis of the image data (FIG. 3/STEP 102).

Next, the avatar coordinate determination unit 34 of the server 3 determines the coordinates and the posture of the first avatar A1 in the virtual space VS on the basis of the coordinates and the posture of the first player P1 in the real space RS recognized by the player information recognition unit 32, and determines the coordinates and the posture of the second avatar A2 in the virtual space VS on the basis of the coordinates and the posture of the second player P2 in the real space RS (FIG. 3/STEP 103).

Next, the virtual space image determination unit 35 and the virtual space sound determination unit 36 of the server 3 determine the image and sound to be perceived by the player P on the basis of the coordinates and the postures of the first avatar A1 and the second avatar A2 in the virtual space VS (FIG. 3/STEP 104).

Next, the HMD 4 worn by the player P causes the monitor 41 mounted on the HMD 4 to display the determined image and causes the speaker 42 mounted on the HMD 4 to generate the determined sound (FIG. 3/STEP 105).

Next, the player information recognition unit 32 of the server 3 determines whether the movement of the coordinates or the change of the posture of the first player P1 or the second player P2 in the real space RS is recognized (FIG. 3/STEP 106).

When the movement of the coordinates or the change of the posture of the first player P1 or the second player P2 in the real space RS is recognized (when it is YES in STEP 106), the processing returns to STEP 103 and the processing of STEP 103 and thereafter is executed again.

Meanwhile, when the movement of the coordinates or the change of the posture of the first player P1 or the second player P2 in the real space RS is not recognized (when it is NO in STEP 106), the server 3 determines whether a signal instructing the ending of the processing is recognized (FIG. 3/STEP 107).

When a signal instructing the ending cannot be recognized (when it is NO in STEP 107), the processing returns to STEP 106, and the processing in STEP 106 and thereafter is executed again.

Meanwhile, when a signal instructing the ending is recognized (when it is YES in STEP 107), the VR system S ends the processing for this time.

By the processing above, in the virtual space VS, the first avatar A1 corresponding to the first player P1, the second avatar A2 corresponding to the second player P2, and the plurality of objects including the elevator VS1 which is a mobile body, the switch VS2 relating to the occurrence of a trigger event, and the like are installed.

The first player P1 and the second player P2 become able to perceive that the first player P1 and the second player P2 exist in the virtual space VS and can freely perform motions via the first avatar A1 and the second avatar A2 respectively corresponding to the first player P1 and the second player P2 by the image displayed and the sound generated in the HMD 4 worn by each of the first player P1 and the second player P2.

[Processing at Time of Trigger Event Recognition]

Next, with reference to FIG. 2 and FIG. 4 to FIG. 8, processing to be executed when the VR system S recognizes a trigger event is described.

In the VR system S, when a predetermined trigger event occurs, correction which generates a gap in the correspondence relationship between the coordinates of the first player P1 and the coordinates of the first avatar A1 or the correspondence relationship between the second player P2 and the second avatar A2 is performed. In the description below, correction which generates a gap in the correspondence relationship between the coordinates of the first player P1 and the coordinates of the first avatar A1 is described.

Figure 5A:
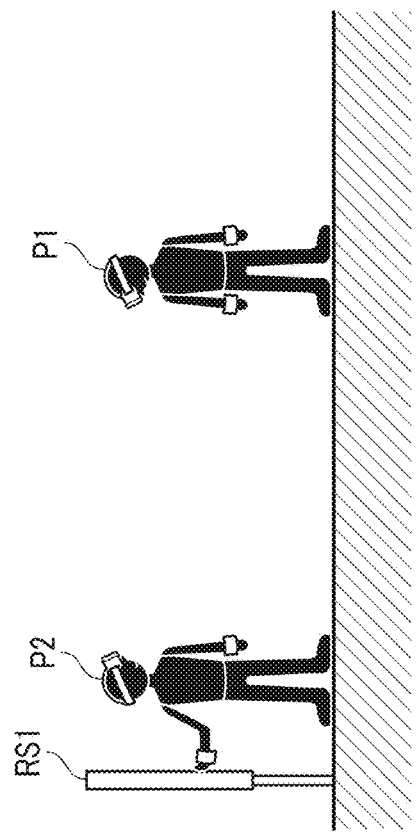
FIG. 5A is a view illustrating the state of the real space and FIG. 5B is a view illustrating the state of the virtual space.
Figure 5B:
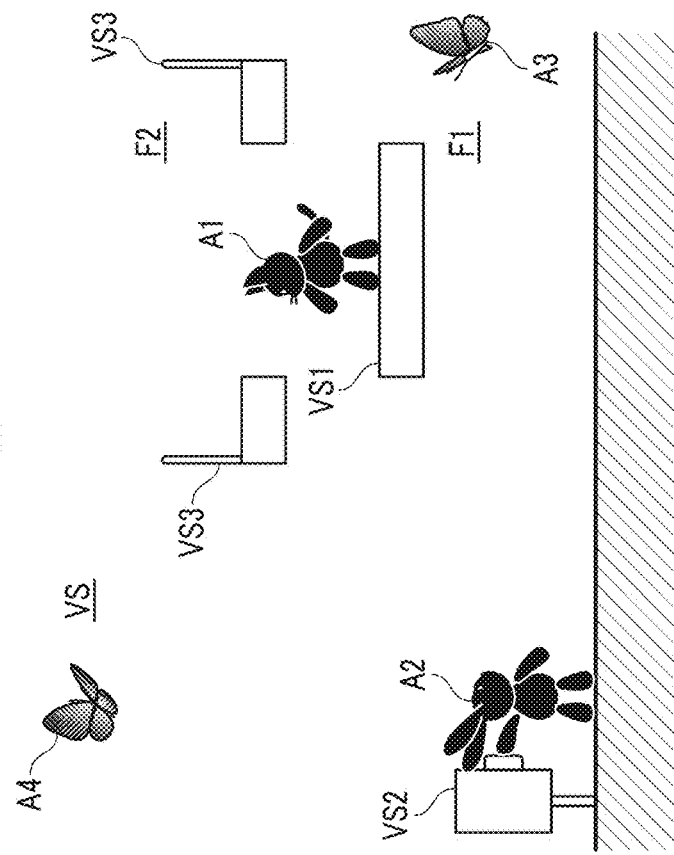

Specifically, in the VR system S, in a state in which the first avatar A1 is riding the elevator VS1 which is a mobile body (in other words, a state in which the first avatar A1 and the elevator VS1 are connected to each other) as illustrated in FIG. 4B, the pressing of the switch VS2 by the second avatar A2 as illustrated in FIG. 5B is set to be a key to the occurrence of a trigger event.

When the occurrence of the trigger event is recognized, as illustrated in FIG. 4 to FIG. 6, the first avatar A1 corresponding to the coordinates of the first player P1 move upward regardless of the movement of the coordinates of the first player P1. Specifically, the first avatar A1 is moved from a first floor F1 which is a first-floor part defined in the virtual space VS to a second floor F2 which is a second-floor part by the elevator VS1.

By the above, in the VR system S, the first player P1 of which corresponding first avatar A1 is moved and the second player P2 which is perceiving the first avatar A1 can be caused to perceive the virtual space VS expanded more to the up-down direction as compared to the real space RS.

When such gap is generated, there is a fear that the first player P1 and the second player P2 may not be able to properly grasp the positional relationship with each other in the real space RS. As a result, there has been a fear that the first player P1 and the second player P2 may unintentionally come into contact with each other.

For example, in the state illustrated in FIG. 6, the second player P2 may misunderstand that the first player P1 is also moving upward in the real space RS as with the first avatar A1. The second player P2 may misunderstand that the second avatar A2 corresponding to the second player P2 in the virtual space VS is able to move to a place below the elevator VS1 and may try to move the second avatar A2 to the place below the elevator VS1 (see FIG. 7).

However, in the real space RS, the first player P1 corresponding to the first avatar A1 actually exists in the same height as the second player P2. Therefore, in this case, in the real space RS, the first player P1 and the second player P2 come into contact with each other. As a result, there is a fear that the sense of immersion of the first player P1 and the second player P2 into the virtual space VS is inhibited.

Thus, in the VR system S, by executing the processing described below when the occurrence of a predetermined trigger event is recognized, unintentional contact between the first player P1 and the second player P2 is prevented without inhibiting the sense of immersion.

In the processing, first, the avatar coordinate determination unit 34 of the server 3 determines whether the first avatar A1 is connected to the mobile body (FIG. 8/STEP 201).

Specifically, as illustrated in FIG. 4, the avatar coordinate determination unit 34 determines whether the coordinates of the first player P1 have moved in the real space RS such that the first avatar A1 corresponding to the coordinates of the first player P1 rides the elevator VS1 which is a mobile body in the virtual space VS.

When it is determined that the first avatar A1 is not connected to the mobile body (when it is NO in STEP 201), the processing returns to STEP 201 and the determination is executed again. This processing is repeated at a predetermined control cycle until the first avatar A1 is in a state of riding the elevator VS1.

Meanwhile, when it is determined that the first avatar A1 is connected to the mobile body (when it is YES in STEP 201), the trigger event recognition unit 33 of the server 3 determines whether the occurrence of the trigger event based on the motion of the second player P2 is recognized (FIG. 8/STEP 202).

Specifically, the trigger event recognition unit 33 determines whether the second player P2 has moved and is in a predetermined posture in the real space RS (see FIG. 5A) such that the second avatar A2 corresponding to the second player P2 is in the posture of touching the switch VS2 in a position near the switch VS2 (see FIG. 5B) in the virtual space VS.

When the coordinates of the second player P2 moves to the predetermined position and the posture of the second player P2 is in the predetermined posture, the trigger event recognition unit 33 recognizes that the trigger event based on the motion of the second player P2 has occurred.

When the occurrence of the trigger event is not recognized (when it is NO in STEP 202), the processing returns to STEP 202 and the determination is executed again. This processing is repeated at a predetermined control cycle while the first avatar A1 is in a state of riding the elevator VS1.

Meanwhile, when the occurrence of the trigger event is recognized (when it is YES in STEP 202), the display image generation unit 31 of the server 3 generates a third avatar A3 and a fourth avatar A4 (FIG. 8/STEP 203).

Specifically, the avatar generation unit 31b of the display image generation unit 31 generates the third avatar A3 corresponding to the first player P1 and the fourth avatar A4 corresponding to the second player P2 in the virtual space VS by considering the occurrence of the trigger event to be the trigger.

At this time, the coordinates at which the third avatar A3 and the fourth avatar A4 are generated are coordinates independent from the coordinates of the first player P1 and the coordinates of the second player P2. At this time point, the coordinates of the third avatar A3 and the coordinates of the fourth avatar A4 may be determined on the basis of the coordinates of the first player P1 and the coordinates of the second player P2, and the third avatar A3 and the fourth avatar A4 may be generated in the determined coordinates as described below.

Next, the player information recognition unit 32 of the server 3 acquires image data captured by the camera 2 and recognizes the coordinates and the postures of the first player P1 and the second player P2 in the real space RS on the basis of the image data (FIG. 8/STEP STEP 204).

Next, the avatar coordinate determination unit 34 of the server 3 determines the coordinates and the postures of the first avatar A1 and the third avatar A3 in the virtual space VS on the basis of the coordinates and the posture of the first player P1 in the real space RS recognized by the player information recognition unit 32 (FIG. 8/STEP 205).

Specifically, the avatar coordinate determination unit 34 determines the coordinates and the posture of the first avatar A1 by correcting the coordinates and the posture of the first avatar A1 based on the coordinates and the posture of the first player P1 in accordance with the content (in other words, the correction direction and the correction amount) of the gap defined in advance depending on the type of the trigger event.

More specifically, the avatar coordinate determination unit 34 performs determination as the coordinates and the posture obtained by moving the coordinates and the posture of the first avatar A1 based on the coordinates and the posture of the first player P1 upward by the amount of the height of the second floor F2 with respect to the first floor F1, and the coordinates and the posture of the first avatar A1.

The avatar coordinate determination unit 34 determines the coordinates and the posture of the third avatar A3 on the basis of the coordinates and the posture of the first avatar A1 on which correction has not been performed.

Next, the avatar coordinate determination unit 34 of the server 3 determines the coordinates and the postures of the fourth avatar A4 in the virtual space VS on the basis of the coordinates and the posture of the second player P2 in the real space RS recognized by the player information recognition unit 32 (FIG. 8/STEP 206).

Specifically, the avatar coordinate determination unit 34 determines the coordinates and the posture of the fourth avatar A4 on the basis of the coordinates and the posture obtained by correcting the coordinates and the posture of the second avatar A2 based on the coordinates and the posture of the second player P2 in accordance with the content (in other words, the correction direction and the correction amount) of the gap defined in advance depending on the type of the trigger event.

More specifically, the avatar coordinate determination unit 34 determines the coordinates and the posture of the fourth avatar A4 on the basis of the coordinates and the posture obtained by moving the coordinates and the posture of the second avatar A2 based on the coordinates and the posture of the second player P2 upward by the amount of the height of the second floor F2 with respect to the first floor F1.

Next, the avatar coordinate determination unit 34 of the server 3 moves the coordinates and changes the postures of the first avatar A1, the third avatar A3, and the fourth avatar A4 on the basis of the determined coordinates and postures (FIG. 8/STEP 207).

Figure 4A:
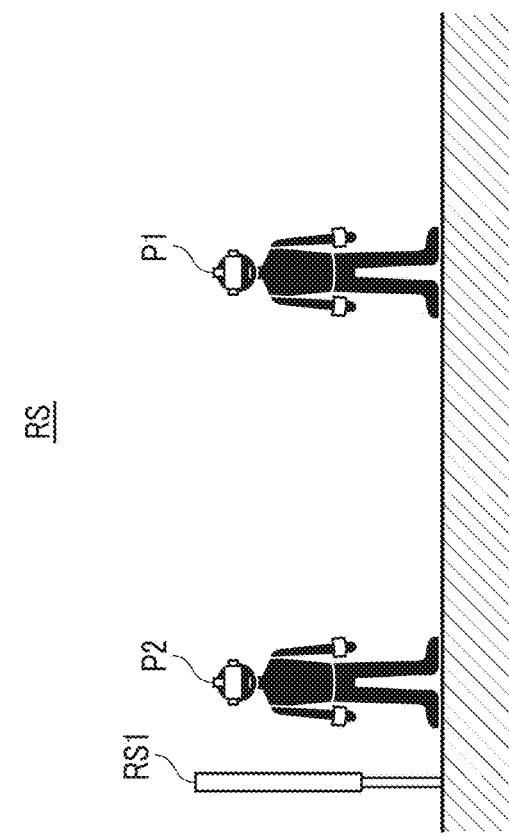
Figure 6B:
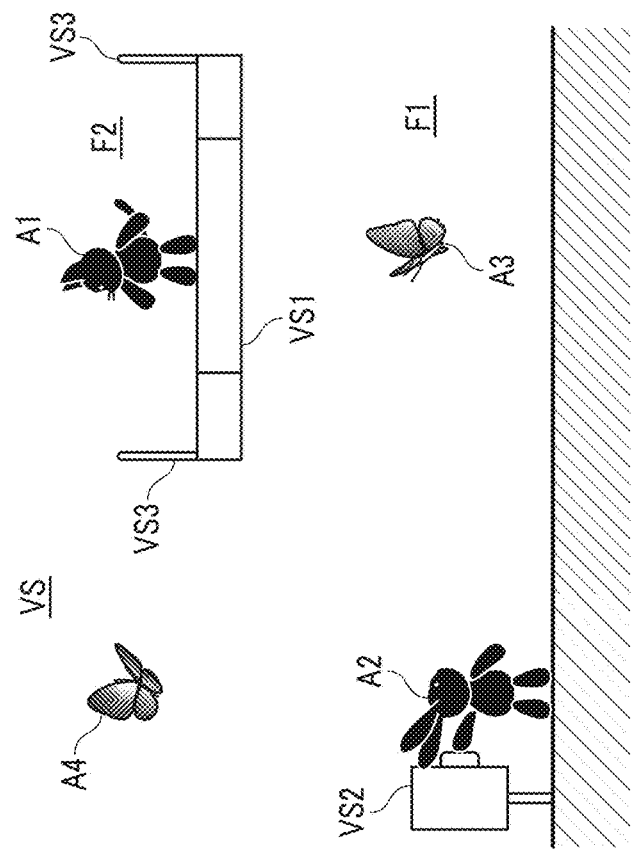
FIG. 6A is a view illustrating the state of the real space and FIG. 6B is a view illustrating the state of the virtual space.
Figure 6A:
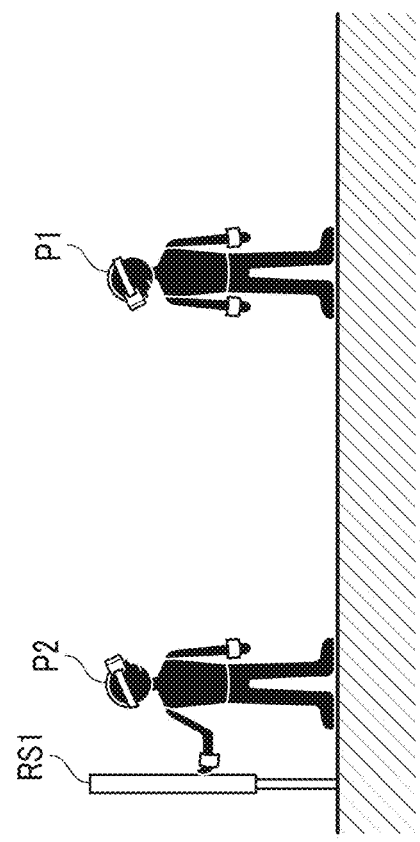

Specifically, as illustrated in FIG. 4A, FIG. 5A, and FIG. 6A, regardless of the change of the coordinates of the first player P1, the coordinates of the first avatar A1 are moved upward by the height of the second floor F2 with respect to the first floor F1 as illustrated in FIG. 4B, FIG. 5B, and FIG. 6B. At this time, the posture of the first avatar A1 changes in correspondence with the posture of the first player P1 in the coordinates of the first avatar A1 from time to time.

As illustrated in FIG. 4B, FIG. 5B, and FIG. 6B, the coordinates of the third avatar A3 move to the coordinates of the first avatar A1 before being moved. The coordinates of the fourth avatar A4 move to coordinates obtained by moving the coordinates of the second avatar A2 upward as with the first avatar A1. The postures of the third avatar A3 and the fourth avatar A4 change in correspondence with the postures of the first player A1 and the second player P2 on the basis of the correspondence relationship which are defined in advance.

Next, the virtual space image determination unit 35 and the virtual space sound determination unit 36 of the server 3 determine the image and sound to be perceived by the player P on the basis of the coordinates and the postures of the first avatar A1, the second avatar A2, the third avatar A3, and the fourth avatar A4 in the virtual space VS (FIG. 8/STEP 208).

Specifically, when the trigger event is recognized, the image and sound to be perceived by the first player P1 are caused to include an image and sound in which the second avatar A2 relatively moves with respect to the first avatar A1 so as to correspond to the gap generated in the correspondence relationship between the coordinates of the first player P1 and the coordinates of the first avatar A1.

The image and sound to be perceived by the second player P2 are caused to include an image and sound in which the first avatar A1 moves so as to generate a gap in the correspondence relationship between the coordinates of the first player P1 and the coordinates of the first avatar A1.

After the trigger event is recognized, the image and sound to be perceived by the first player P1 and the second player P2 are caused to include an image and sound of the third avatar A3 and the fourth avatar A4 in addition to the image and sound of the first avatar A1 and the second avatar A2 which have been included up to that point.

Next, the HMD 4 worn by the player P displays an image determined by the monitor 41 and generates sound in the speaker 42 (FIG. 8/STEP 209).

Next, the player information recognition unit 32 of the server 3 determines whether the movement of the coordinates or the change of the posture of the first player P1 or the second player P2 in the real space RS is recognized (FIG. 8/STEP 210).

When the movement of the coordinates or the change of the posture of the first player P1 or the second player P2 in the real space RS is recognized (when it is YES in STEP 210), the processing returns to STEP 204 and the processing of STEP 204 and thereafter is executed again.

Meanwhile, when the movement of the coordinates or the change of the posture of the first player P1 or the second player P2 in the real space RS is not recognized (when it is NO in STEP 210), the server 3 determines whether a signal instructing the ending of the processing is recognized (FIG. 8/STEP 211).

When a signal instructing the ending cannot be recognized (when it is NO in STEP 211), the processing returns to STEP 210, and the processing in STEP 210 and thereafter is executed again.

Meanwhile, when a signal instructing the ending is recognized (when it is YES in STEP 211), the VR system S ends the processing for this time.

As described above, in the VR system S, when a predetermined trigger event is recognized, an image and sound of the second avatar A2 relatively moving with respect to the first avatar A1 are included the image and sound to be perceived by the first player P1. The image and sound to be perceived by the second player P2 are caused to include an image in which the first avatar A1 moves.

Therefore, the line of sight of the first player P1 when the predetermined trigger event is recognized naturally follows the second avatar A2. The line of sight of the second player P2 naturally follows the movement of the first avatar A1.

When the predetermined trigger event is recognized, the third avatar A3 corresponding to the first player P1 and the fourth avatar A4 corresponding to the second player P2 are generated in the virtual space VS in addition to the first avatar A1 corresponding to the first player P1 and the second avatar A2 corresponding to the second player P2.

In other words, the fourth avatar A4 is generated while the attention of the first player P1 is drawn to the movement of the second avatar A2. The third avatar A3 is generated while the attention of the second player P2 is drawn to the movement of the first avatar A1.

After the trigger event is recognized, the image and sound of the virtual space VS to be perceived by the first player P1 and the second player P2 are also caused to include the image and sound of the third avatar A3 and the fourth avatar A4.

By the above, according to the VR system S, a case where the first player P1 thinks that the fourth avatar A4 has suddenly appeared (and a feeling of strangeness given to the first player P1) can be suppressed. As a result, the first player P1 can be caused to accept the existence of the fourth avatar A4 without inhibiting the sense of immersion of the first player P1.

By the above, according to the VR system S, a case where the second player P2 thinks that the third avatar A3 has suddenly appeared (and a feeling of strangeness given to the second player P2) can be suppressed. As a result, the second player P2 can be caused to accept the existence of the third avatar A3 without inhibiting the sense of immersion of the second player P2.

When another avatar exists in the virtual space VS, the player normally tries to avoid contact between the avatar corresponding to the player and the other avatar.

In the VR system S, when a trigger event occurs and a gap is generated between the coordinates of the first player P1 and the coordinates of the first avatar A1 corresponding to the first player P1, the third avatar A3 corresponding to the coordinates of the first player P1 is generated, and the fourth avatar A4 is generated in coordinates obtained by correcting the coordinates corresponding to the coordinates of the second player P2 so as to correspond to the gap.

Then, the image and sound of the virtual space VS to be perceived by the first player P1 are caused to include the image and sound of the fourth avatar A4. The image and sound of the virtual space VS to be perceived by the second player P2 are caused to include the image and sound of the third avatar A3.

Therefore, after the trigger event is recognized, when the first player P1 performs some kind of motion, the first player P1 performs the motion while naturally avoiding contact between the first avatar A1 corresponding to the corrected coordinates of the first player P1 and the fourth avatar A4 corresponding to the corrected coordinates of the second player.

When the second player P2 performs some kind of motion, the second player P2 performs the motion while naturally avoiding contact between the second avatar A2 corresponding to the coordinates of the second player P2 and the third avatar A3 corresponding to the coordinates of the first player P1.

By the above, the contact between the first player P1 and the second player P2 in the real space RS can be prevented.

Figure 7B:
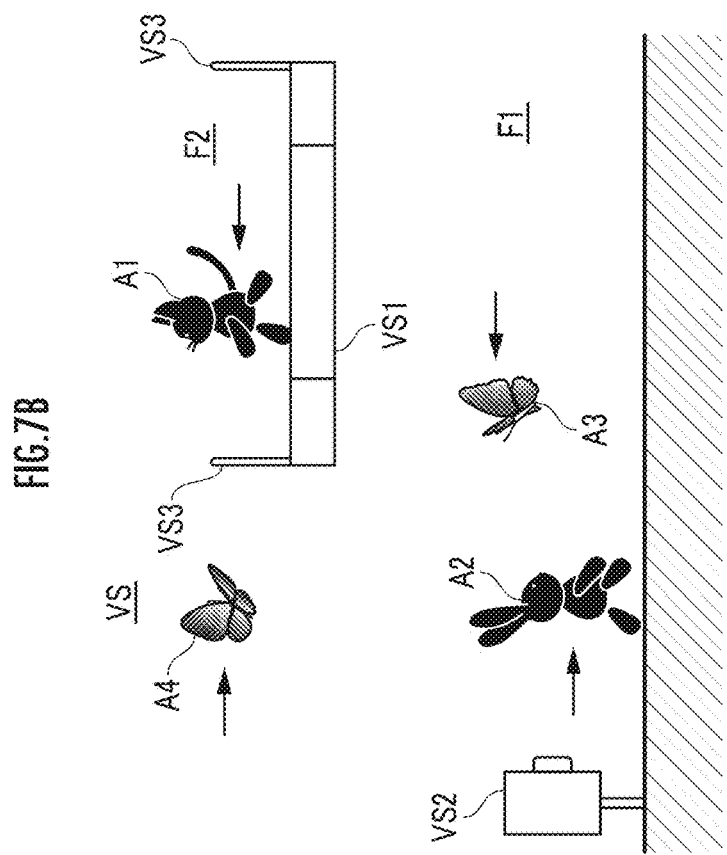
FIG. 7A is a view illustrating the state of the real space and FIG. 7B is a view illustrating the state of the virtual space.
Figure 7A:
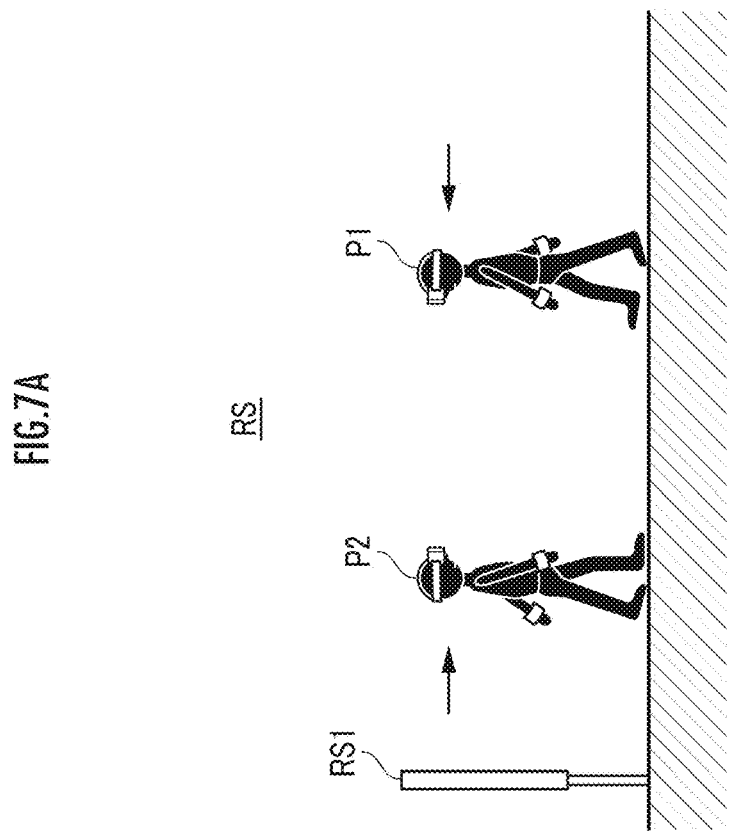

Specifically, as illustrated in FIG. 7, when the first avatar A1 corresponding to the first player P1 and the fourth avatar A4 approach each other in the virtual space VS, the first player P1 naturally performs a motion so as to avoid contact. Therefore, contact with the second player P2 corresponding to the fourth avatar A4 in the real space RS is avoided.

Similarly, when the second avatar A2 corresponding to the second player P2 and the third avatar A3 approach each other in the virtual space VS, the second player P2 naturally performs a motion so as to avoid contact. Therefore, contact with the first player P1 corresponding to the third avatar A3 in the real space RS is avoided.

In the VR system S, the third avatar A3 corresponding to the first player P1 and the fourth avatar A4 corresponding to the second player P2 are generated with use of the trigger event as a key. The above is performed to cause both of the first player P1 and the second player P2 to perform motions of avoiding contact in the real space RS.

However, the virtual space experience system of the present invention is not limited to such configuration and a configuration in which only one of the third avatar and the fourth avatar is generated may be employed.

Specifically, for example, in the abovementioned VR system S, the second floor F2 to which the first avatar A1 moves when the trigger event occurs, a fence VS3 that limits the movement of the first avatar A1 exists. For example, when the movement of the first player P1 to the coordinates of the second player P2 can be limited by the fence VS3, the generation of the fourth avatar A4 may be omitted.

In the VR system S, as shapes of the first avatar A1 and the second avatar A2, animal-type characters which are standing upright are employed. Meanwhile, as shapes of the third avatar A3 and the fourth avatar A4, butterfly-type characters are employed. The above is employed to cause the shapes of a plurality of avatars corresponding to one player to be different from each other, to thereby suppress a feeling of strangeness given to another player seeing the avatars.

However, in the virtual space experience system of the present invention, the shapes of the third avatar and the fourth avatar are not limited to such configuration and may be set, as appropriate, in accordance with the aspect of the virtual space. For example, the shapes of the first avatar and the third avatar may be similar, and the color of either may be translucent.

Figure 9:
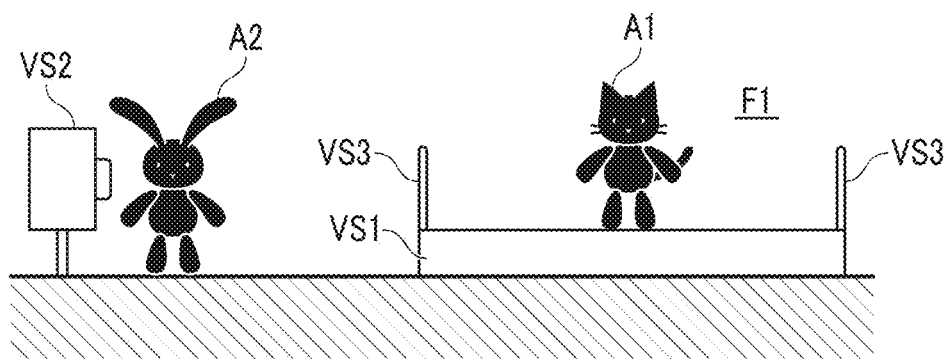
FIG. 9 is a side view illustrating a state before a trigger event starts in a VR system according to a modification and is a view illustrating the state of a virtual space.

In the abovementioned description, as shapes of the third avatar A3 and the fourth avatar A4, butterfly-type characters are employed. However, the virtual space experience system of the present invention is not limited to such configuration. For example, as illustrated in FIG. 9 to FIG. 11, a wall VS4 generated below the elevator VS1 along with the movement of the elevator VS1 may serve as the third avatar.

In the illustrated example, the second floor F2 does not exist. Therefore, as illustrated in FIG. 11, after the trigger event ends, the first player P1 perceives that the first avatar A1 can only move on the elevator VS1 (a range partitioned by the fence VS3). In other words, the motion range of the first player P1 in the real space RS is limited.

Figure 10:
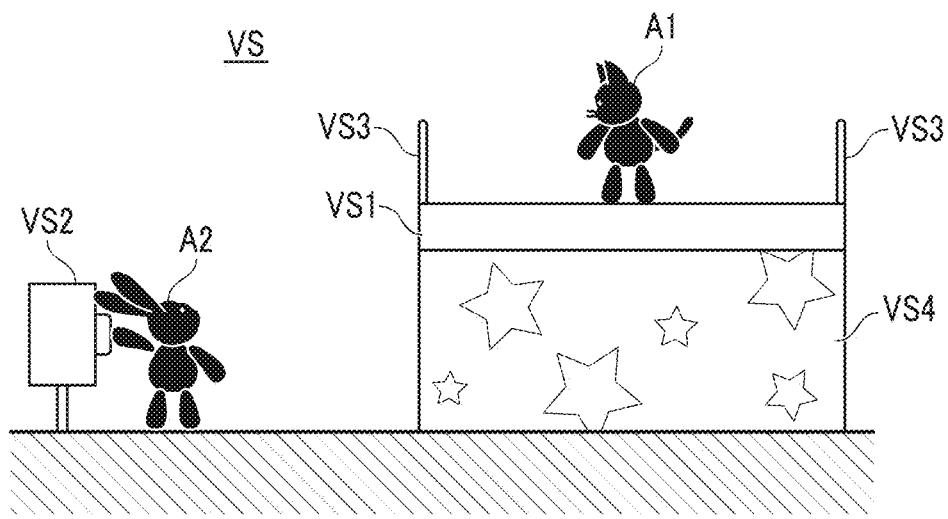
FIG. 10 is a side view illustrating a state when the trigger event starts in the VR system of the modification and is a view illustrating the state of the virtual space.

At this time, as illustrated in FIG. 10 and FIG. 11, when the wall VS4 generated below the elevator VS1 is the wall VS4 that surrounds the range of the virtual space VS corresponding to the range of the motion, a case where it is felt that an avatar corresponding to the first player P1 has increased in number can be suppressed, and a feeling of strangeness given to the second player P2 can be further suppressed.

OTHER EMBODIMENTS

The illustrated embodiment has been described, but the present invention is not limited to such form.

For example, in the abovementioned embodiment, the image and sound to be perceived by the first player and the second player are determined in accordance with the generation of the third avatar and the fourth avatar. However, the virtual space experience system of the present invention is not limited to such configuration, and only the image to be perceived by the first player and the second player may be determined in accordance with the generation of the third avatar and the fourth avatar.

In the abovementioned embodiment, the trigger event occurs via the elevator VS1 which is a mobile body. As a result of the trigger event, the coordinates of the first avatar A1 are corrected so as to move upward, and a gap is generated. The abovementioned configuration is for simplifying the trigger event and the movement direction in order to facilitate understanding.

However, the trigger event in the virtual space experience system of the present invention is not limited to such configuration. Therefore, for example, the trigger event does not necessarily need to be via a mobile body and may occur after a predetermined amount of time elapses after a game and the like start. In addition to the up-down direction, the direction of the gap may be a depth direction, a left-right direction or a direction obtained by combining the depth direction, the left-right direction and/or the up-down direction. The gap may be a gap in terms of time, for example, a delay of the motion of the avatar from the motion of the player.

In the abovementioned embodiment, the third avatar A3 and the fourth avatar A4 are generated at the same time as the occurrence of the trigger event. However, the virtual space experience system of the present invention is not limited to such configuration. For example, the third avatar and the fourth player may be generated at the stage where the movement of the first player P1 and the second player P2 becomes possible after the trigger event ends.

In the abovementioned embodiment, the first avatar A1 and the second avatar A2 continuously exist even after the trigger event ends. However, the virtual space experience system of the present invention is not limited to such configuration, and at least one of the first avatar and the second avatar may be erased after the trigger event ends. When such configuration is employed, a feeling of strangeness given to the player due to the increase of the avatars in number can be suppressed.

REFERENCE SIGNS LIST

1—Marker, 2—Camera, 3—Server, 4—HMD, 31—Display image generation unit, 31a—Virtual space generation unit, 31b—Avatar generation unit, 31c—Mobile body generation unit, 32 . . . Player information recognition unit, 32a—Player posture recognition unit, 32b—Player coordinate recognition unit, 33—Trigger event recognition unit, 34—Avatar coordinate determination unit, 35—Virtual space image determination unit, 36—Virtual space sound determination unit, 41—Monitor (virtual space image displayer), 42—Speaker (virtual space sound generator), A1—First avatar, A2—Second avatar, F1—First floor, F2—Second floor, P—Player, P1—First player, P2—Second player, RS—Real space, RS1—Whiteboard, S—VR system (virtual space experience system), VS—Virtual space, VS1—Elevator (mobile body), VS2—Switch, VS3—Fence, VS4—Wall (third avatar).

The invention claimed is:

1. A virtual space experience system, comprising:
a virtual space generation unit which generates a virtual space corresponding to a predetermined region in a real space in which both of a first player and a second player exist;
an avatar generation unit which generates a first avatar which performs a motion in correspondence with a motion of the first player, and a second avatar which performs a motion in correspondence with a motion of the second player in the virtual space;
a player coordinate recognition unit which recognizes coordinates of the first player and coordinates of the second player in the real space;
an avatar coordinate determination unit which determines coordinates of the first avatar in the virtual space on basis of the coordinates of the first player, and determines coordinates of the second avatar in the virtual space on basis of the coordinates of the second player;
a virtual space image determination unit which determines an image of the virtual space to be perceived by the first player and the second player on basis of the coordinates of the first avatar and the coordinates of the second avatar;
a trigger event recognition unit which recognizes occurrence of a predetermined trigger event; and
a virtual space image displayer which causes the first player and the second player to perceive the image of the virtual space, wherein:
the avatar generation unit generates a third avatar corresponding to the motion of the first player in the virtual space when the trigger event is recognized;
the virtual space image determination unit causes the image of the virtual space to be perceived by the second player to include an image in which the first avatar moves so as to generate a gap in a correspondence relationship between the coordinates of the first player and the coordinates of the first avatar when the trigger event is recognized, and causes the image of the virtual space to be perceived by the second player to include an image of the second avatar and the third avatar after the trigger event is recognized; and
the avatar coordinate determination unit determines coordinates of the third avatar in the virtual space on basis of the coordinates of the first player.

2. The virtual space experience system according to claim 1, wherein:
the avatar generation unit generates a fourth avatar corresponding to the motion of the second player in the virtual space when the trigger event is recognized;
the virtual space image determination unit causes the image of the virtual space to be perceived by the first player to include an image in which the second avatar relatively moves with respect to the first avatar so as to correspond to the gap generated in the correspondence relationship between the coordinates of the first player and the coordinates of the first avatar when the trigger event is recognized, and causes the image of the virtual space to be perceived by the first player to include an image of the first avatar and the fourth avatar after the trigger event is recognized; and
the avatar coordinate determination unit determines coordinates of the fourth avatar in the virtual space on basis of the coordinates of the second player.

3. The virtual space experience system according to claim 1 or 2, wherein the third avatar has a shape which is different from a shape of the first avatar.

4. The virtual space experience system according to claim 3, wherein the third avatar is a wall which surrounds a range of the virtual space corresponding to a motion range of the first player in the real space.

5. A virtual space experience system, comprising:
a virtual space generation unit which generates a virtual space corresponding to a predetermined region in a real space in which both of a first player and a second player exist;
an avatar generation unit which generates a first avatar which performs a motion in correspondence with a motion of the first player, and a second avatar which performs a motion in correspondence with a motion of the second player in the virtual space;
a player coordinate recognition unit which recognizes coordinates of the first player and coordinates of the second player in the real space;
an avatar coordinate determination unit which determines coordinates of the first avatar in the virtual space on basis of the coordinates of the first player, and determines coordinates of the second avatar in the virtual space on basis of the coordinates of the second player;
a virtual space image determination unit which determines an image of the virtual space to be perceived by the first player and the second player on basis of the coordinates of the first avatar and the coordinates of the second avatar;
a trigger event recognition unit which recognizes occurrence of a predetermined trigger event; and
a virtual space image displayer which causes the first player and the second player to perceive the image of the virtual space, wherein:
the avatar generation unit generates a fourth avatar corresponding to the motion of the second player when the trigger event is recognized;
the virtual space image determination unit causes the image of the virtual space to be perceived by the first player to include an image in which the second avatar relatively moves with respect to the first avatar so as to correspond to a gap generated in a correspondence relationship between the coordinates of the first player and the coordinates of the first avatar when the trigger event is recognized, and causes the image of the virtual space to be perceived by the first player to include an image of the first avatar and the fourth avatar after the trigger event is recognized; and the avatar coordinate determination unit determines coordinates of the fourth avatar in the virtual space on basis of the coordinates of the second player.

6. The virtual space experience system according to claim 2, wherein the third avatar has a shape which is different from a shape of the first avatar.

7. The virtual space experience system according to claim 6, wherein the third avatar is a wall which surrounds a range of the virtual space corresponding to a motion range of the first player in the real space.

\* \* \* \* \*